United States Patent [19]

DeStepheno

[11] 4,226,052
[45] Oct. 7, 1980

[54] DISENGAGEABLE HINGE DEVICE FOR A REMOVABLE VEHICLE ROOF PANEL

[75] Inventor: George E. DeStepheno, San Dimas, Calif.

[73] Assignee: Le Van Specialty Co., Inc., City of Industry, Calif.

[21] Appl. No.: 19,003

[22] Filed: Mar. 9, 1979

[51] Int. Cl.³ .............................................. E05C 21/02
[52] U.S. Cl. ........................................ 49/465; 49/261; 296/218
[58] Field of Search ................. 49/463, 465, 261, 394, 49/397; 296/137 B; 98/2, 14

[56] References Cited

U.S. PATENT DOCUMENTS 4,005,901  2/1977  Lutke et al. .................... 296/137 B

FOREIGN PATENT DOCUMENTS 1250613  9/1967  Fed. Rep. of Germany ............. 49/261
2370602  6/1978  France ............................ 296/137 B Primary Examiner—Kenneth Downey
Attorney, Agent, or Firm—Francis X. LoJacono

[57] ABSTRACT

A disengageable hinge device adapted for use with a pivotal-type roof panel, generally referred to as a sun roof, whereby the panel can be removed from the associated frame structure which is affixed to the roof of the vehicle, therein defining an opening, the hinge device comprising the combination of the frame structure having an annular channel adapted to have mounted thereto one or more hinge-retainer body members, wherein the retainer body is positioned to removably accept and engage a hinge-tongue member that is fixedly secured along one edge of the panel member, whereby the panel is pivotally connected to the annular frame structure so as to be positioned in an open or closed mode, and yet provide for the complete separation of the panel from its frame.

5 Claims, 6 Drawing Figures

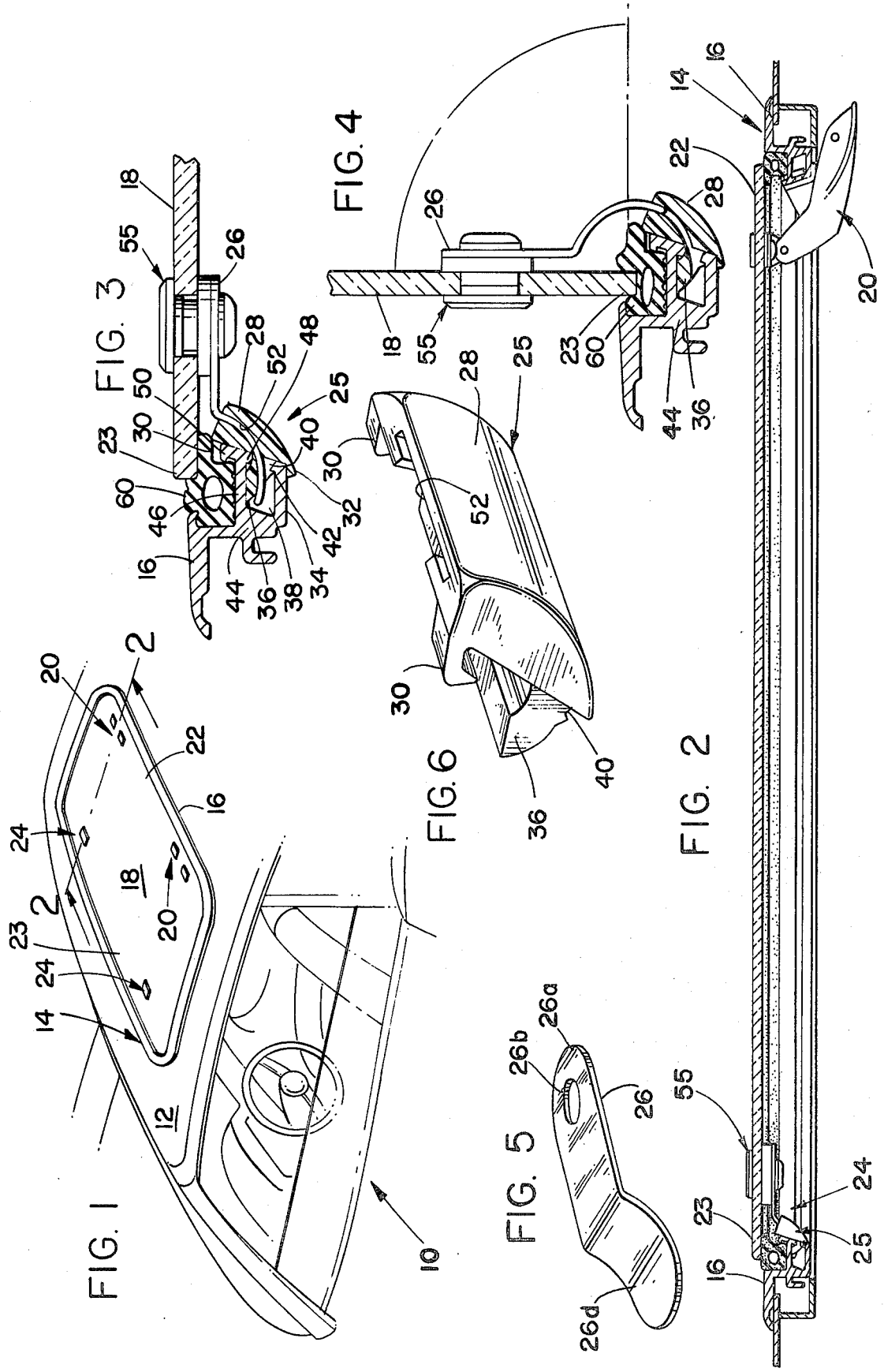

4,226,052

DISENGAGEABLE HINGE DEVICE FOR A REMOVABLE VEHICLE ROOF PANEL

BACKGROUND OF THE INVENTION

1. Field of the Invention

This invention relates to a hinge device, and more particularly to a releasable hinge device designed to be incorporated with the removal of an automobile roof panel from a fixed frame structure.

2. Description of the Prior Art

As is well known in the art, various problems and difficulties are encountered in providing suitable hinging means for automobile sun-roof panels, particularly where the hinge means is required to allow the panel to be readily disengaged from the fixed frame structure.

Several types of hinge devices are used in conjunction with vehicle roof panels. Some are very simple and only allow the panels to be opened and closed. Other known hinge devices that allow the panels to be completely removed have features that are generally not compatible with all types of vehicles or with safety requirements. Thus, some of these devices are restrictive in their use. Other devices are too complicated for the average person to operate; and some are found to be too expensive to install and maintain.

As examples of different types of releasable hinge means, there is disclosed in U.S. Pat. No. 3,955,848 a panel having a very simple hinge arrangement which comprises a tongue member that is inserted in a slot formed in a wall portion of the roof, wherein the slot is provided only with a rubber collar. This simple arrangement is no longer a feasible design within today's known art structure. An arrangement of this type cannot withstand the rigid standards established in the automobile industry at the present time.

Another hinge device is illustrated in U.S. Pat. No. 4,005,901 which is an improvement over the above device, but yet does not provide the versatility or capability to be employed in all makes and models of vehicles—from passenger cars to vans and trucks. Further, the angle at which the panel is allowed to open when using this hinge device limits the angle at which the panel can be raised above the roof structure of the vehicle. Thus, a very loose fit is inherent in its design, with the possibility of premature separation.

SUMMARY OF THE INVENTION

Thus, the present invention has for an important object, to provide a releasable hinge device for roof panels that is compatible with the state of the art as now presented, particularly with respect to the sun-roof panels that are specifically designed for installation in an aftermarket—that is where the panel unit is installed by the vehicle owner.

The present invention is adapted to be supported within the annular frame structure that is affixed within an opening cut in the roof of a vehicle, wherein the frame includes an annular channel adapted to receive and hold in place a hinge retainer body so designed as to readily receive a pivotal tongue member therein, the tongue member being secured to the movable panel. With the arrangement of the retainer body and tongue member as herein disclosed, a panel can be opened to a greater degree than heretofore possible—without disengaging the two elements prematurely.

It is another object of the invention to provide a releasable hinge device for sun-roof panels, the hinge-retainer body having a hinge-receiving arcuate slot wherein the tongue receiving end terminates in a substantially upright position, thus preventing inadvertent disengagement of the tongue member, but allowing easy engagement of the tongue therein when the panel is to be replaced and connected to the frame structure.

It is still another object of the invention to provide a removable hinge device having relatively few operating parts, therefore making it easily serviceable by anyone.

A further object of the present invention is to provide a device of this character that is relatively inexpensive to manufacture, and that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a fragmentary pictorial view of a vehicle having a typical sun-roof unit installed therein;

FIG. 2 is a cross-sectional view thereof taken substantially along line 2—2 of FIG. 1;

FIG. 3 is an enlarged cross-sectional view of the hinge device wherein the panel is shown in a closed position and the hinge-body member is secured to the fixed annular frame structure;

FIG. 4 is an enlarged cross-sectional view of the hinge device wherein the panel is shown in a vertical removable position;

FIG. 5 is a perspective view of the hinge-tongue member; and

FIG. 6 is a perspective view of the hinge-body member.

DESCRIPTION OF THE PREFERRED EMBODIMENT

Referring more particularly to FIG. 1, there is shown a partial pictorial view of an automobile, generally indicated at 10, which represents any type of vehicle including vans and trucks having roof 12 wherein a sun-roof unit 14 comprises a single fixed frame structure 16 having a substantially rectangular configuration that is secured within an opening formed in the roof 12. Pivotally mounted to frame structure 16 is a panel member 18 which is operably connected to frame 16 by at least one latching device, indicated at 20, said latching device being located along the rearward edge 22 of panel 18, and illustrated in FIG. 2. The hinge devices 24 are oppositely disposed along the front or leading edge 23 of panel 18. Thus, panel 18 can be operated to an open mode or to a closed sealed mode, as shown.

Accordingly, there are times when one would want to remove panel 18 altogether—thereby leaving a clear free opening within the frame structure. It is important, however, that the opening defined therein be as clear as possible from projecting obstructions, so as to avoid possible injury to passengers with the vehicle.

Hence, the present hinge device 24 has been designed to readily allow for the complete separation of the panel from the frame, and further allow the panel to be re-engaged therewith in a very simple manner, whereby the panel cannot be inadvertently separated. That is, to separate or completely disengage panel 18 from the frame 16, latch 20 must first be separated and panel 18 must then be raised to a substantially vertical position (approximately 90° from horizontal) before the present hinge device 24 can be disengaged.

The disengageable hinge device 24 comprises a hinge retainer bracket 25 which is designed to be affixed to the fixed frame structure 16, without the need for additional securing means such as rivets, screws, etc. A hinge-tongue member 26 is secured to the leading front edge of panel 18, and is adapted to be slidably engaged and supported within retainer body 25.

Retainer bracket 25 is formed having a main body 28 with a front curved surface which faces inwardly from the roof opening. A pair of oppositely disposed latch fingers 30 are providing at each outer upper corner of body 28. These latch fingers are arranged to engage the annular frame structure 16, as seen in FIG. 3. Said fingers act as a securing means together with a depending flange-coupling member 32 which extends from the lower portion of body 28, so as to engage the lower member 34 of frame 16. Body 28 further includes a strut member 36 that is formed to project rearwardly so as to be received in the annular channel 38 formed in frame 16, thereby providing a stabilized support member to aid in fastening the retainer bracket. Strut member 36 also is provided with a notch 40 that is arranged to receive lip 42 disposed on the lower member 34 of frame 16.

Frame structure 16 of the sun-roof unit is formed by an extrusion molding consisting generally of one elongated piece and then arranged to the proper cross-sectional rectangular configuration, as seen in FIGS. 2 and 3, in which annular channel 38 is formed and defined by lower wall member 34 which includes flange member 32, rear wall 44, and an upper wall member 46 having a depending flange member 48 which engages strut member 36 and the rear of body 28. Upper wall member 46 also includes a lip member 50 for latching engagement with latch fingers 30. Thus, together with the associated members of frame 16 and hinge bracket 25, a fastening or securing means is established therebetween, whereby the hinge bracket need only be snapped into place in a cooperating position with respect to each hinge-tongue member 26.

It is important to note that hinge-retainer bracket 25 includes a circular arcuate slot 52, having an arc of approximately 90° so that the one end terminates in a vertical plane and the opposite end thereof terminates in a horizontal plane. The positioning of this arcuate slot is an important feature in the operation of the hinge, which will hereinafter be described.

Hinge-tongue member 26 comprises a strap of metal having two sections. The first section 26a is formed substantially flat and having a hole 26b disposed therein; and a second section 26d is formed having an arcuate configuration to match the arc of slot 52 of the retainer bracket 25. Hence, tongue 26 is mounted to panel 18 by any suitable mounting means, such as a cap-and-bolt device 55, as seen in FIG. 3. The mounting of tongue 26 is such that it is readily received and arcuately slidable in retainer bracket 25.

In FIG. 3, second section 26d of tongue 26 is fully disposed in slot 52; and the free end of said tongue extends outwardly from the terminating horizontal end of slot 52. Accordingly panel 18 is at this time in a closed horizontal position and firmly sealed against the annular resilient seal 60 of the frame structure 16. Seal member 60 also provides a biasing restraint to the pivotal operation of panel 18. That is, as the panel is moved to an open position, the leading edge will engage seal 60 to control its lifting action.

Futher—and most importantly—due to the arcuate position of slot 52, panel 18 must be forced against seal 60 and be positioned substantially vertical as seen in FIG. 4, before tongue 26 can be separated from bracket 25. Thus, tongue 26 cannot be inadvertently disengaged or separated from slot 52.

The invention and its attendant advantages will be understood from the foregoing description; and it will be apparent that various changes may be made in the form, construction and arrangement of the parts of the invention without departing from the spirit and scope thereof or sacrificing its material advantages, the arrangement herein before described being merely by way of example; and I do not wish to be restricted to the specific form shown or uses mentioned, except as defined in the accompanying claims.

I claim:

1. A disengageable hinge device for a removable vehicle roof panel associated with a fixed frame structure, comprising:
   a hinge-bracket member having means to secure said bracket in a fixed position on said fixed frame structure;
   a circular arcuate slot formed in said bracket having one open end terminating in a substantially vertical plane and an opposite open end terminating in a substantially horizontal plane;
   a disengageable hinge-tongue member fixedly mounted to said panel for engagement with said hinge-bracket member, said tongue having an arcuate, projecting, end section to conform to said arcuate slot of said bracket member, whereby said panel must be rotated to a substantially vertical position before being separated from said frame structure; and
   wherein said hinge bracket comprises a main body having said arcuate slot disposed therein, and wherein said securing means comprises:
   a pair of latch fingers extending outwardly from the upper portion of said body to latch to said frame structure;
   a strut member adapted to be received in said frame structure; and
   a depending flange-coupling member arranged to connect to said frame structure at the lower portion thereof.

2. A disengageable hinge device as recited in claim 1, wherein said frame structure includes:
   an annular channel adapted to receive said hinge bracket therein; and
   a biasing means to control the pivotal movement of said panel.

3. A disengageable hinge device as recited in claim 2, wherein said biasing means comprises a sealing member disposed about the peripheral upper side of said frame structure.

4. A disengageable hinge device as recited in claim 3, wherein said strut member is positioned to be coupled within said channel of said frame, and said latch finger latched to a flange member formed in said frame structure.

5. A disengageable hinge device as recited in claim 4, wherein said hinge bracket includes a curved outer surface.

* * * * *